W. C. KORTHALS-ALTES.
BRUSH SHIFTING DEVICE FOR ALTERNATING CURRENT MOTORS.
APPLICATION FILED FEB. 13, 1918.
1,376,020.
Patented Apr. 26, 1921.
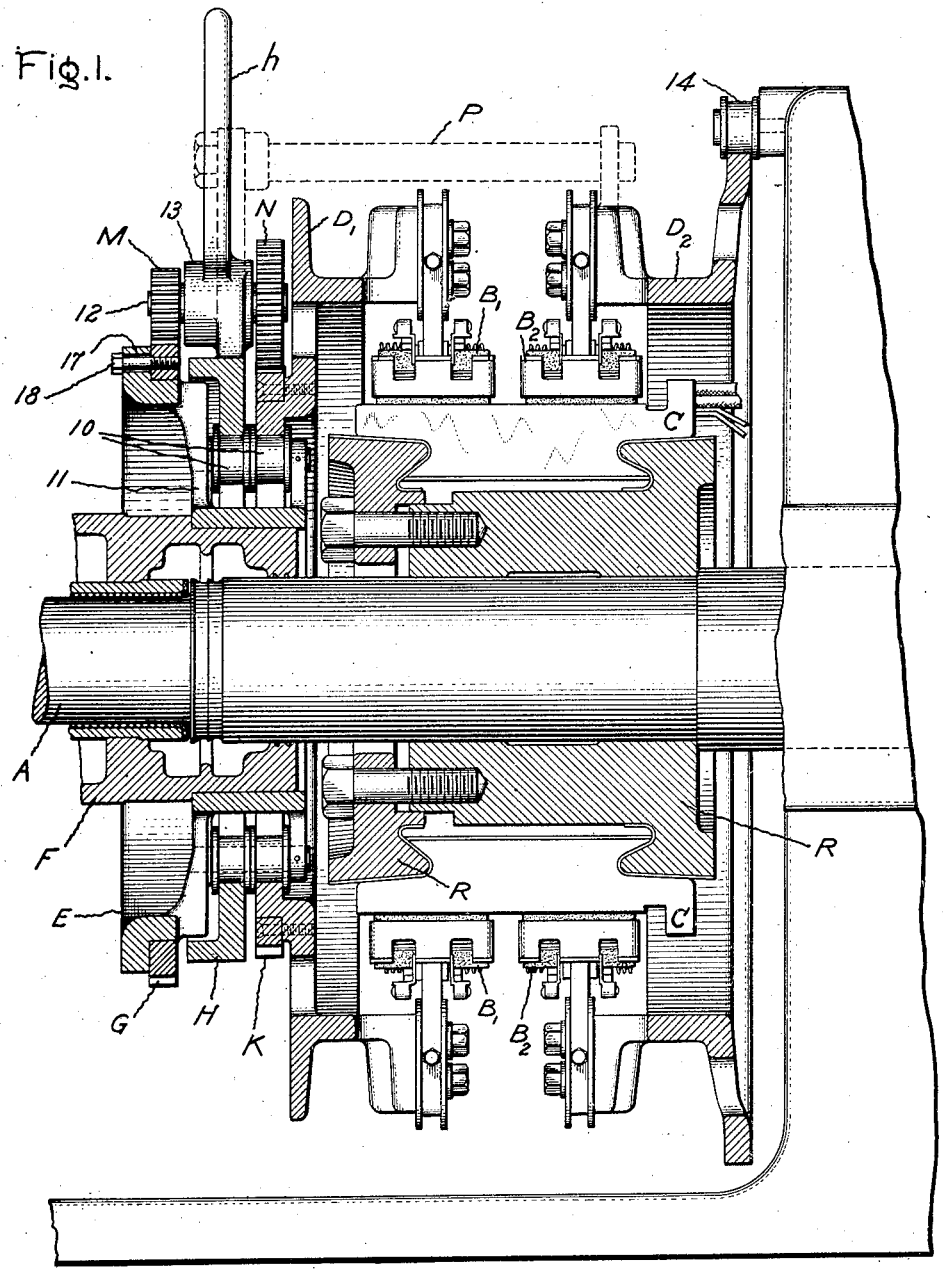
Inventor:
Willem C. Korthals-Altes,
by
His Attorney.

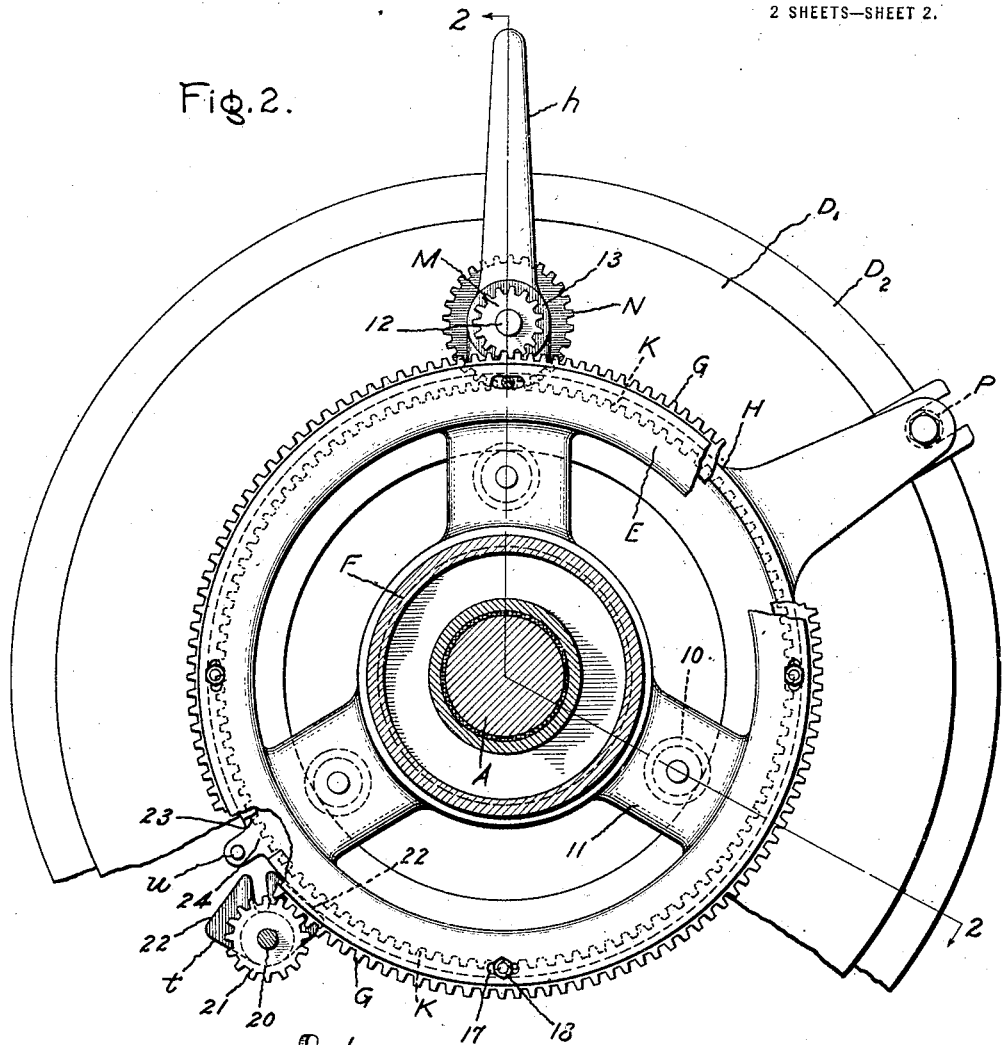

UNITED STATES PATENT OFFICE.

WILLEM C. KORTHALS-ALTES, OF SCHENECTADY, NEW YORK, ASSIGNOR TO GENERAL ELECTRIC COMPANY, A CORPORATION OF NEW YORK.

BRUSH-SHIFTING DEVICE FOR ALTERNATING-CURRENT MOTORS.

1,376,020.  Specification of Letters Patent.  Patented Apr. 26, 1921.

Application filed February 13, 1918. Serial No. 216,948.

*To all whom it may concern:*

Be it known that I, WILLEM C. KORTHALS-ALTES, a subject of the Queen of the Netherlands, residing at Schenectady, county of Schenectady, State of New York, have invented certain new and useful Improvements in Brush-Shifting Devices for Alternating-Current Motors, of which the following is a specification.

This invention relates to a brush shifting device for alternating current motors.

More particularly this invention relates to alternating current motors having commutators in which the number of conductors in the rotor winding, which are in circuit between the brushes, determines the speed of the motor.

The objects of this invention are to provide an improved brush shifting device which is rugged and efficient in operation and insures a precise regulation of the speed together with the time-phase adjustment of the rotor current.

In alternating current motors whose speed is determined by the number of conductors in the rotor winding in series between brushes on a commutator, such as is described in Reissue Patent No. 14,031 issued to Schrage and in which the rotor has a primary and regulating winding, the latter being conductively related to the secondary to impress a bucking or boosting regulating E. M. F. to lower or raise the motor speed from synchronism, the brushes have heretofore been shifted relatively with uniform angular velocities, but such shifting became unsatisfactory at speeds remote from synchronism because the motor torque fell off, which falling off I have ascertained is due to the lagging or leading current drawn by the secondary at these speeds.

When the direction of rotation was to be reversed, the phase connections to the polyphase primary were reversed, which reversal also interfered with the torque developed by the motor because the direction in which the lagging or leading component of the current was compensated for is reversed.

In the practice of my invention I have provided a novel arrangement of gears for simultaneously moving the brush supporting yokes relatively with different angular velocities so proportioned that the current is kept substantially in phase at all speeds by adjusting the phase of the regulating current, and I have also provided an identical absolute angular movement of the brushes for shifting the phase adjustment of the rotor current when the direction of rotation is reversed so as to still keep the current substantially in phase.

For a more complete understanding of the nature and objects of this invention, reference should be had to the following detailed description when taken in connection with the accompanying drawings in which Figure 1 shows a section taken on line 2—2 in Fig. 2 of a brush shifting device embodying my invention as applied to a commutator motor. Fig. 2 shows a side elevation, parts being broken away, of my improved brush shifting device. Fig. 3 is a perspective view showing the arrangement of the gears for effecting the relative movement of the brushes, and Figs. $4^a$, $4^b$, $4^c$, and $4^d$ are explanatory diagrams.

Referring now to Fig. 1 of the drawings, A denotes the rotor or armature shaft, which carries the commutator composed of bars C, secured to the shaft A by suitably mounted clamping rings R—R. On the commutator bear two relatively movable sets of coöperating brushes denoted $B_1$ and $B_2$. These sets of brushes are mounted on the movable yokes $D_1$ and $D_2$ respectively.

I will now describe my improved device for shifting these brushes. On the flanged member E, which is rigidly secured to a portion of the motor frame F (here shown as a portion which includes a bearing for the shaft A), I have mounted the gear G, which I will designate as the "stationary gear," although I have found for certain purposes hereinafter set forth, that it is desirable to impart a certain limited motion to this gear at times.

In addition to the "stationary gear" G, I have provided a movable member or ring H and a movable gear K which is secured to the yoke $D_1$. Both the ring H and yoke $D_1$ are mounted to ride upon anti-friction sheaves 10 pivoted to upstanding lugs 11 which are conveniently formed on the flanged member E.

The ring H carries the planetary gears M and N, which mesh with the gears G and K respectively, and which are rigidly secured on a stud shaft 12 rotatably mounted in the ring H, as shown at 13.

Rods P are employed to rigidly connect ring H with the movable yoke $D_2$ which is mounted to ride upon anti-friction sheaves 14 conveniently pivoted to a portion of the motor-frame.

Ring H is also preferably provided with a handle $h$ so that it can be readily manipulated when it is desired to effect the relative movement of the yokes $D_1$ and $D_2$.

It is, of course, understood that the ratios in the gearing above described may be chosen so that any desired relative angular motion of the yokes can be effected by the movement of the handle $h$. In the ratios chosen for illustration the gear G is shown larger than gear K, the gear G having 122 teeth while gear K has but 114. The planetary gear M has 15 teeth while gear N has 28. It is consequently seen that a movement of ring H in one direction effects a movement of gear K in the opposite direction, i. e., if handle $h$ and yoke $D_2$ are moved clockwise in Fig. 2, gear K and yoke $D_1$ will move counter-clockwise and vice versa.

In a motor which is designed for speed regulation through synchronous speed, it is essential that some provision shall be made for the time-phase adjustment of the currents in the stator and rotor because the rotor current is lagging below synchronous speed, while above synchronous speed it is leading.

In consequence it is desirable to have the regulating electromotive force applied so as to compensate for this effect in order that the stator and rotor currents shall be more nearly in phase, thereby giving the motor more uniform torque characteristics.

In the motor here chosen for illustration this compensation is effected by choosing the gear ratios such that one set of brushes, namely those indicated at $B_1$, moves with a substantially greater angular velocity than those indicated at $B_2$. Consequently there is supplied a larger and larger component of the regulating electromotive force to buck the reactive component due to the leading current as the speed is increased above synchronous speed, which regulating component tends to keep the currents in phase; and conversely, a larger and larger boosting component of the regulating electromotive force is applied as the speed is decreased below synchronous speed.

The movement of the brushes for accomplishing this effect will be clearly comprehended by reference to Figs. 4ª and 4ᵇ in which the brushes $B_1$ and $B_2$ are shown in their relative positions when the motor is running "fast" or above synchronous speed and when running "slow" or below synchronous speed, the commutator being indicated as turning counter-clockwise. It is seen that the arc through which the brush $B_1$ has been moved is substantially greater than that through which the brush $B_2$ has moved.

When, however, it is desired to reverse the motor, the phase connections are of course reversed; but the movement of the brushes which applied a bucking component of the regulating electromotive force to bring the leading current more nearly in phase now applies a boosting component. Obviously the adjustment of the brushes must be changed so as to convert the boosting component into a bucking component and vice versa.

In order to accomplish this reversal of components, I find it necessary to provide for the absolute movement of the brushes to a limited extent. Such movement is here shown as provided by forming the "stationary gear" G with slots 17 through which pass the bolts 18 for securing the gear G to the flanged member E, thereby permitting the gear G to be rotated through a small angle corresponding to the arcuate length of the slot.

This movement of the gear G permits the yokes carrying the brushes $B_1$ and $B_2$ to be shifted bodily through identical absolute angular displacements as indicated in Fig. 4ᶜ which shows the commutator as rotating in the clockwise direction. From the position in Fig. 4ᶜ where the motor is running "slow" or below synchronous speed, the brushes may again be shifted relatively to the position shown in Fig. 4ᵈ where the motor is running "fast" or above synchronous speed, the commutator being shown as rotating clockwise.

It is particularly desirable to have this absolute movement take place at the same time that the phase connections to the motor are reversed when reversing the direction of rotation of the motor.

In order that this absolute movement of the brushes may be automatically effected when the phase connections are reversed, I have provided a stop mechanism actuated by the movement of ring H in a certain predetermined position which will simultaneously move gear G and throw the current reversing switch, which mechanism I will now describe.

Rotatively mounted at some convenient point in the flanged member E is the shaft 20 as clearly shown in Fig. 3, on one end of which is mounted the reversing switch S. On the other end of the shaft 20 is mounted the pinion 21 to mesh with the gear G and also the intermittent gear $t$ to be engaged by pin $u$ carried by the ring H.

The intermittent gear $t$ is formed with sides 22 adapted to lie adjacent to the annular flange 23 formed on the ring H when the gear is not in motion.

In order that the gear $t$ may freely rotate, and thereby rotate the shaft 20, when engaged by pin $u$, I have cut away a portion of the flange 23 opposite the pin $u$ forming as it were a notch shown at 24 into which the teeth of the gear $t$ project when turned from one position to the other as it is engaged by pin $u$ in passing.

The mode of operation of this invention is as follows:

Assuming that the motor is running at a certain speed of rotation and a change in speed is desired, the ring H is moved by the handle $h$ in a direction to effect a movement of the brushes that will change the speed in the desired direction.

When a reversal of the motor is desired, the ring H is moved until the pin $u$ engages with gear $t$ to turn it to its other position. This movement of gear $t$ effects the simultaneous movement of the "stationary gear" G and the reversing switch S, whereupon the motor will commence revolving in the reverse direction with the time phase of the rotor current adjusted to give as good torque characteristics as when revolving in the first direction provided that suitable gear ratios have been chosen for the intermittent motion.

While I have here shown an embodiment of my invention which is, at present, the best means known to me for carrying the same into effect, I would have it understood that this is merely illustrative and that I do not mean to be limited thereby to the precise details here disclosed, since obvious alterations thereof will appear to those skilled in this art, nor in the choice of recognized equivalents except as defined in my claims hereunto annexed.

What I claim as new and desire to secure by Letters Patent of the United States, is,—

1. In an alternating current commutator motor, a brush shifting device comprising coöperating sets of brushes, a pair of rotatively mounted yokes for movably supporting said sets of brushes, movable and stationary gears and coöperating planetary gears all connected to said yokes in a manner for effecting their simultaneous angular movements through relatively different amplitudes in a predetermined ratio.

2. In an alternating current commutator motor, a brush shifting device comprising coöperating sets of brushes, a pair of rotatively mounted yokes for movably supporting said sets of brushes, a gear secured to the motor frame, a second gear secured to one of said yokes, coöperating planetary gears mounted to move with the other yoke, said gears being proportioned and arranged to effect simultaneous angular movements of said yokes relatively in a predetermined ratio.

3. In an alternating current commutator motor, a brush shifting device comprising coöperating sets of brushes, a pair of rotatively mounted yokes for movably supporting said sets of brushes, a gear secured to the motor frame, a second gear secured to one of said yokes, a third member secured to the other yoke and carrying planetary gears arranged to mesh with the first mentioned gears, and supporting bearings for said yokes and third member.

4. In an alternating current commutator motor, a brush shifting device comprising coöperating sets of brushes, a pair of rotatively mounted yokes for movably supporting said sets of brushes, means for effecting simultaneous angular movements of said yokes relatively in a predetermined ratio, and means for effecting the absolute movement of said brushes for changing the time-phase relations of the rotor current.

5. In an alternating current commutator motor, a brush shifting device comprising coöperating sets of brushes, a pair of rotatively mounted yokes for movably support-said sets of brushes, means for effecting simultaneous angular movements of said yokes relatively to each other, a current reversing switch, and means for actuating said switch by the movement of said yokes when in a predetermined position.

6. In an alternating current commutator motor, a brush shifting device comprising coöperating sets of brushes, a pair of rotatively mounted yokes for movably supporting said sets of brushes, means for effecting simultaneous angular movements of said yokes relatively to each other, a current reversing switch, and means for effecting absolute movement of said brushes and the simultaneous actuation of said switch by the movement of said yokes when in a predetermined position.

7. In an alternating current commutator motor, a brush shifting device comprising coöperating sets of brushes, a pair of rotatively mounted yokes for movably supporting said sets of brushes, a movable gear, a stationary gear having a limited arcuate movement, and coöperating planetary gears, said gears connected to said yokes in a manner permitting simultaneous angular movements relatively and a limited identical absolute angular movement of said yokes.

8. In an alternating current commutator motor, a brush shifting device comprising coöperating sets of brushes, a pair of rotatively mounted yokes for movably supporting said sets of brushes, a movable gear, a stationary gear having a limited arcuate movement, a current reversing switch, an actuating gear therefor meshing with said stationary gear, and coöperating planetary gears, said gears connected to said yokes in a manner permitting simultaneous relative angular movements thereof and the actuation of said switch upon an identical absolute angular movement of said yokes.

9. In an alternating current commutator motor, a brush shifting device comprising coöperating sets of brushes, a pair of rotatively mounted yokes for movably supporting said sets of brushes, a gear secured to one of said yokes, a second gear secured to the motor frame so as to have a limited arcuate movement, a third member secured to the other yoke and carrying planetary gears arranged to mesh with the first two gears, a current reversing switch, an actuating shaft therefor having a pinion engaging said second gear and an intermittent gear, and means on said third member for actuating said intermittent gear when moved through a predetermined position.

10. In an alternating current commutator motor, a brush shifting device comprising coöperating sets of brushes, a pair of rotatively mounted yokes for movably supporting said sets of brushes, a gear secured to one of said yokes, a second gear secured to the motor frame so as to have a limited arcuate movement, a flanged ring secured to the other yoke and carrying planetary gears arranged to mesh with the first two gears, a current reversing switch, an actuating shaft therefor having a pinion engaging said second gear and an intermittent gear whose sides lie adjacent the flange of said ring, and a notch and pin formed in said flange and arranged to engage with said intermittent gear when said ring is moved through a predetermined position.

In witness whereof, I have hereunto set my hand this 11th day of February, 1918.

WILLEM C. KORTHALS-ALTES.